(12) United States Patent
Hsia et al.

(10) Patent No.: US 8,503,126 B2
(45) Date of Patent: Aug. 6, 2013

(54) MAGNETO-ELASTIC ANISOTROPY ASSISTED THIN FILM STRUCTURE

(75) Inventors: Yiao-Tee Hsia, Wexford, PA (US); Wei Peng, Wilkinsburg, PA (US); Timothy J. Klemmer, Pittsburgh, PA (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 13/352,692

(22) Filed: Jan. 18, 2012

(65) Prior Publication Data

US 2012/0113541 A1 May 10, 2012

Related U.S. Application Data

(62) Division of application No. 11/265,031, filed on Nov. 2, 2005, now Pat. No. 8,119,265.

(51) Int. Cl.
*G11B 5/02* (2006.01)
*H01F 7/06* (2006.01)

(52) U.S. Cl.
USPC ............................ 360/59; 360/55; 29/602.1

(58) Field of Classification Search
None
See application file for complete search history.

(56) References Cited

U.S. PATENT DOCUMENTS

| | | | |
|---|---|---|---|
| 4,060,798 A * | 11/1977 | Schloemann et al. | 365/25 |
| 4,775,576 A | 10/1988 | Bouchand et al. | |
| 5,052,232 A * | 10/1991 | Garshelis | 73/862.336 |
| 5,189,578 A | 2/1993 | Mori et al. | |
| 5,195,377 A * | 3/1993 | Garshelis | 73/779 |
| 5,891,586 A * | 4/1999 | Hasegawa et al. | 428/668 |
| 6,103,405 A | 8/2000 | Tomita | |
| 6,127,053 A | 10/2000 | Lin et al. | |
| 6,220,105 B1 * | 4/2001 | Cripe | 73/862.69 |
| 6,829,157 B2 * | 12/2004 | Kim et al. | 365/157 |
| 7,059,201 B2 * | 6/2006 | Prakash et al. | 73/862.041 |
| 7,230,844 B2 * | 6/2007 | Deak | 365/171 |
| 7,372,722 B2 * | 5/2008 | Jeong et al. | 365/158 |
| 8,023,218 B2 * | 9/2011 | Zhou et al. | 360/59 |
| 8,119,265 B2 * | 2/2012 | Hsia et al. | 428/832 |
| 8,129,043 B2 * | 3/2012 | Hauet et al. | 428/831 |
| 8,233,314 B2 * | 7/2012 | Mullner et al. | 365/157 |
| 8,310,861 B2 * | 11/2012 | Liu et al. | 365/158 |
| 2001/0035056 A1 * | 11/2001 | Garshelis | 73/862.336 |
| 2002/0117727 A1 * | 8/2002 | Engel et al. | 257/421 |
| 2003/0203244 A1 | 10/2003 | Isono et al. | |
| 2004/0001394 A1 | 1/2004 | Challener et al. | |
| 2004/0001420 A1 | 1/2004 | Challener | |
| 2004/0062503 A1 | 4/2004 | Challener | |

(Continued)

FOREIGN PATENT DOCUMENTS

JP 62249408 A 10/1987

OTHER PUBLICATIONS

K. Ozawa et al., "Oblique Incidence Effects in Evaporated Iron Thin Films", Journal of Magnetism and Magnetic Materials, 35 (1983), pp. 289-292.

(Continued)

*Primary Examiner* — Kevin Bernatz
(74) *Attorney, Agent, or Firm* — Hall Estill Attorneys at Law

(57) ABSTRACT

A method includes activating a stress-effecting layer of a thin film structure, having the stress effecting layer adjacent to a magnetic layer, to induce a magneto-elastic anisotropy in the magnetic layer.

20 Claims, 5 Drawing Sheets

U.S. PATENT DOCUMENTS

| | | | |
|---|---|---|---|
| 2004/0115481 | A1 | 6/2004 | Pelhos et al. |
| 2004/0233578 | A1 | 11/2004 | Gao |
| 2004/0240327 | A1 | 12/2004 | Sendur et al. |
| 2005/0041950 | A1 | 2/2005 | Rottmayer et al. |
| 2005/0052771 | A1 | 3/2005 | Rausch et al. |
| 2005/0066897 | A1 | 3/2005 | Pelhos et al. |
| 2005/0067272 | A1 | 3/2005 | Pelhos |
| 2005/0078565 | A1 | 4/2005 | Peng et al. |
| 2005/0106810 | A1* | 5/2005 | Pakala et al. ............ 438/257 |
| 2005/0111309 | A1 | 5/2005 | Peng |
| 2008/0265234 | A1* | 10/2008 | Breitwisch et al. ............ 257/2 |

OTHER PUBLICATIONS

W.P. Van Drent et al., "The Effect of Stress and Magnetostriction on the Anisotropy of CoNi/Pt Multilayers", Journal of Magnetism and Magnetic Materials, 156 (1996), pp. 309-310.

K-S. Moon et al., "Dependence of Structural and Magnetic Properties on Deposition Angle in Electron-Beam Evaporated Co/Pt Multilayer Thin Films", Journal of Applied Physics, vol. 79, No. 8, Apr. 15, 1996, pp. 4991-4993.

S. Jo et al., "Magnetic Anisotropy of Sputtered FeN Films Due to Anisotropic Columnar Growth of Grains", IEEE Trans. on Magn., vol. 33, No. 5, Sep. 1997, pp. 3634-3636.

K-Z. Gao et al., "Magnetic Recording Configuration for Densities Beyond 1 Tb/in2 and Data Rates Beyond 1 Gb/s", IEEE Trans. on Magn., vol. 38, No. 6, Nov. 2002, pp. 3675-3683.

K-Z. Gao et al., "Track Edge Effects in Tilted and Conventional Perpendicular Recording", Journal of Applied Physics, vol. 93, No. 10, May 15, 2003, pp. 7840-7842.

D. S. Grummon, "Thin-Film Shape-Memory Materials for High-Temperature Applications", JOM, Dec. 2003, pp. 24-32.

W. Peng et al., "Thermo-Magneto-Mechanical Analysis of Head-Disk Interface in Heat Assisted Magnetic Recording", Tribology International 38,(2005), pp. 588-593.

* cited by examiner

MAGNETO-ELASTIC ANISOTROPY ASSISTED THIN FILM STRUCTURE

CROSS REFERENCE TO RELATED APPLICATION

This application is a divisional application of U.S. patent application Ser. No. 11/265,031, filed on Nov. 2, 2005, which is hereby incorporated by reference.

STATEMENT REGARDING FEDERALLY SPONSORED RESEARCH OR DEVELOPMENT

This invention was made with United States Government support under Agreement No. 70NANB1H3056 awarded by the National Institute of Standards and Technology (NIST). The United States Government has certain rights in the invention.

FIELD OF THE INVENTION

The present invention relates to thin film structures, and more particularly, relates to a stress-effecting layer for inducing magneto-elastic anisotropy in a thin film structure.

BACKGROUND INFORMATION

Demands are currently being made to further increase the capacity of magnetic data storage. A major objective of research efforts in thin film magnetic materials is to make magnetic recording media with properties that are suitable for recording at higher data densities. Achievement of higher recording densities is impaired by several problems. First, as the quantity of magnetic flux corresponding to the data becomes smaller, it becomes increasingly difficult to separate the data signal from the noise. Second, as the recording density increases, the super-paramagnetic limit of the material is approached so that thermal energy can potentially randomize the data stored in the magnetic material. Both of these problems are related to the energy density associated with the magnetic anisotropy of the magnetic material.

There is identified a need for an improved magnetic thin film, and particularly an improved magnetic recording media, that overcomes the limitations, disadvantages, or shortcomings of known magnetic thin films.

SUMMARY OF THE INVENTION

In one aspect, a method includes comprising: activating a stress-effecting layer of a thin film structure, having the stress effecting layer adjacent to a magnetic layer, to induce a magneto-elastic anisotropy in the magnetic layer.

In another aspect, a method includes positioning a recording head adjacent to a data storage medium having a stress effecting layer adjacent to a magnetic layer; activating the stress-effecting layer to induce a magneto-elastic anisotropy in the magnetic layer; and applying a magnetic field to the data storage medium to write data to the data storage medium.

DETAILED DESCRIPTION

Various embodiments of the present disclosure are generally directed to thin film magnetic structures that have transient induced magneto-elastic anisotropy during the writing process and can be used, for example, with magnetic, magneto-optical and/or optical recording heads. The various embodiments have utility for use as a perpendicular, longitudinal or tilted magnetic recording medium of a magnetic data storage system. In addition, the various embodiments have utility for use with a system that utilizes heat-assisted magnetic recording (HAMR).

Figure 1:
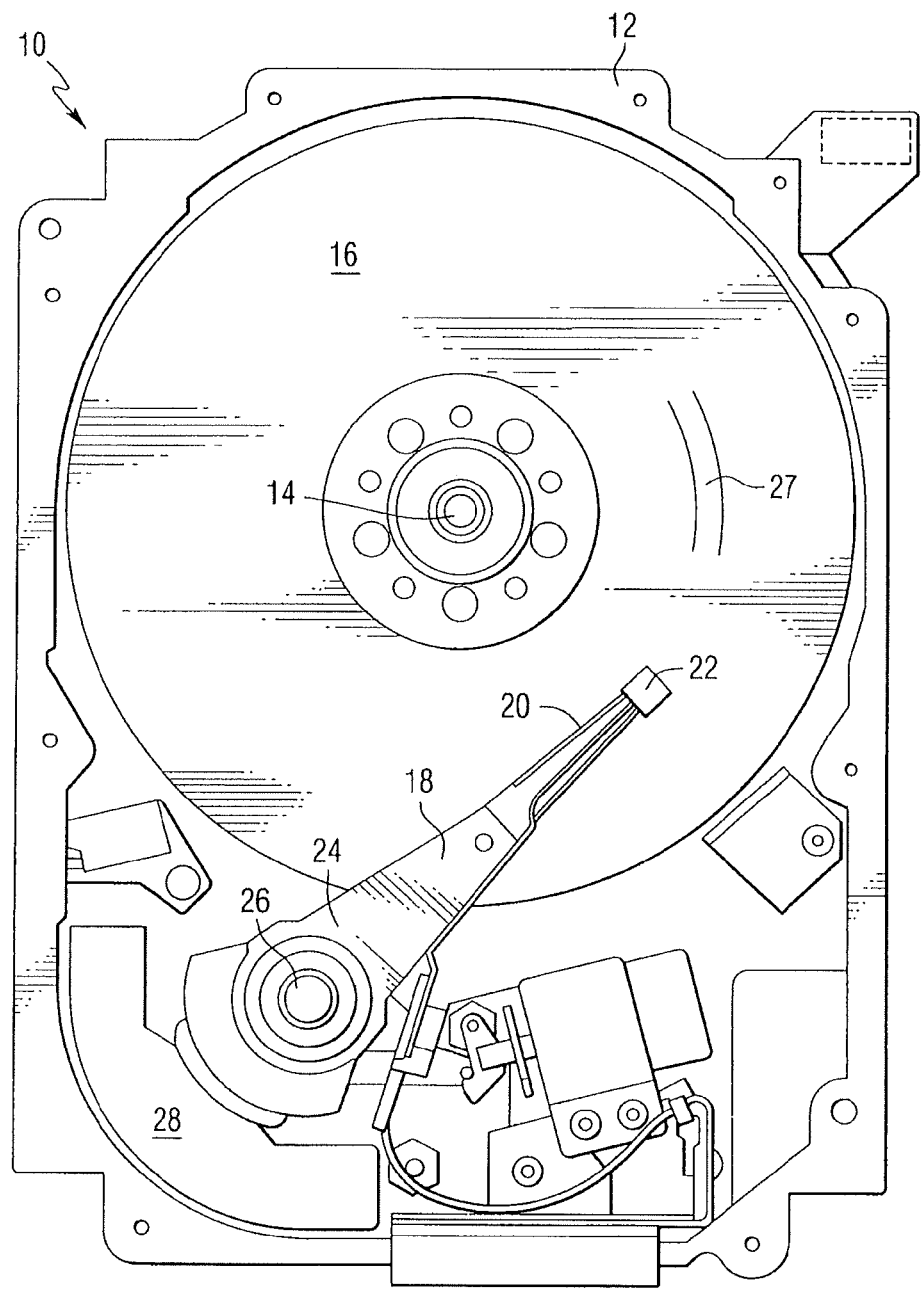
FIG. 1 is a pictorial representation of a disc drive that may utilize a recording medium constructed in accordance with the invention.

FIG. 1 is a pictorial representation of a disc drive 10 that can utilize a thin film structure in accordance with some embodiments. The disc drive 10 includes a housing 12 (with the upper portion removed and the lower portion visible in this view) sized and configured to contain the various components of the disc drive. The disc drive 10 includes a spindle motor 14 for rotating at least one magnetic storage medium, such as a magnetic recording medium 16, which may be a perpendicular, longitudinal and/or tilted magnetic recording medium, within the housing 12. At least one arm 18 is contained within the housing 12, with each arm 18 having a first end 20 with a recording head or slider 22, and a second end 24 pivotally mounted on a shaft by a bearing 26. An actuator motor 28 is located at the arm's second end 24 for pivoting the arm 18 to position the recording head 22 over a desired sector or track 27 of the disc 16. The actuator motor 28 is regulated by a controller, which is not shown in this view and is well known in the art.

Figure 2:
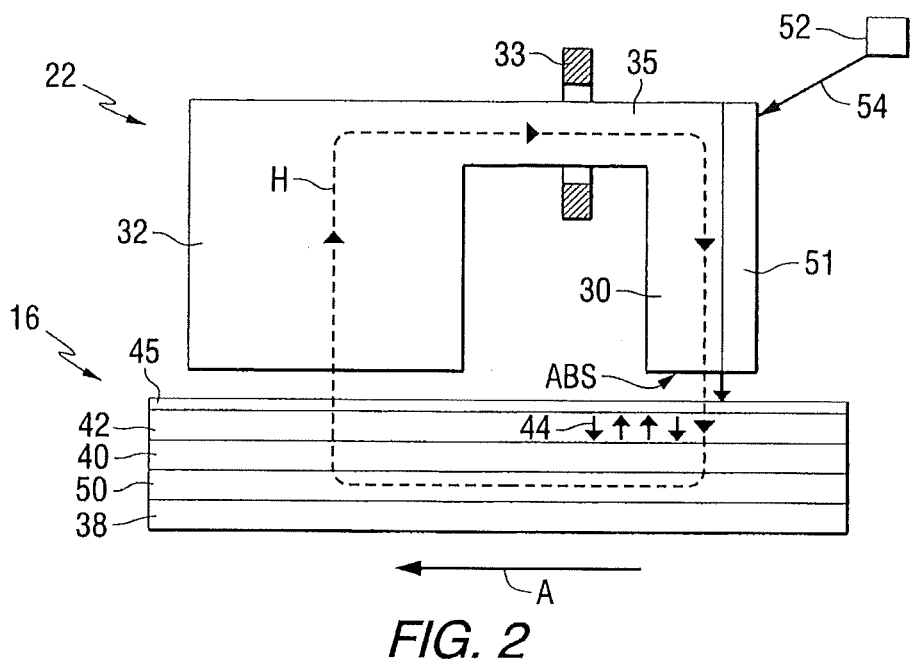
FIG. 2 is a schematic representation of a perpendicular heat assisted magnetic recording head constructed in accordance with the invention.

FIG. 2 is a partially schematic side view of a perpendicular HAMR head 22 and a magnetic recording medium 16. Although an example of the invention is described herein with reference to recording head 22 as a heat-assisted perpendicular magnetic recording head and the medium 16 as a perpendicular magnetic recording medium, it will be appreciated that aspects of the invention may also be used in conjunction with other type recording heads and/or recording mediums that employ heat assisted recording as well as recording heads that do not utilize heat in the recording process.

As shown in FIG. 2, the HAMR head 22 may include a writer section comprising a main write pole 30 and a return or opposing pole 32 that are magnetically coupled by a yoke or pedestal 35. Flux (H) is directed from the main pole 30 into the recording medium 16 and can be returned to the opposing pole 32. It will also be appreciated that the HAMR head 22 may be constructed with a write pole 30 only and no return pole 32 or yoke 35. A magnetization coil 33 may surround the yoke or pedestal 35 for energizing the HAMR head 22. The recording medium 16 is positioned adjacent to or under the recording head 22 for movement, for example, in the direction of arrow A. A magnetic layer 42, which in this embodiment is a hard magnetic perpendicular recording layer as illustrated by the perpendicular oriented magnetic domains 44, is deposited adjacent to or on a stress-effecting layer 40 that may be formed adjacent a soft magnetic layer 50. The HAMR head 22 also may include a read head, not shown, which may be any conventional type read head. The read section may include, for example, a conventional giant magneto-resistance (GMR) reader, magnetic-resistance reader, inductive reader, magneto-optical reader, or the like as is also generally known in the art.

Still referring to FIG. 2, the recording head 22 may also include structure for HAMR to heat the magnetic recording medium 16 proximate to where the write pole 30 applies the magnetic write field H to the recording medium 16. Specifically, such structure for HAMR can include, for example, an optical waveguide, schematically represented by reference number 51, in optical communication with a light source 52. The light source 52 may be, for example, a laser diode, or other suitable laser light sources for coupling a light beam 54 into the waveguide 50.

Figure 3:
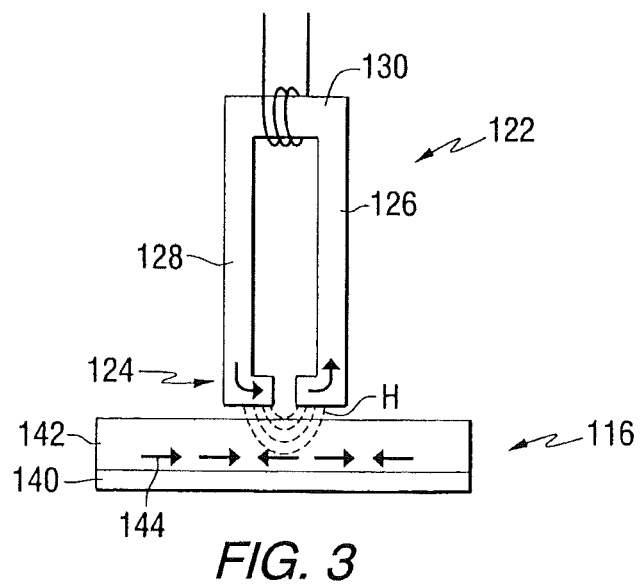
FIG. 3 is a schematic representation of a longitudinal recording head constructed in accordance with the invention.

FIG. 3 is a partially schematic side view of a longitudinal magnetic recording head 122 and a magnetic recording medium 116 in accordance with an embodiment of the present invention. As shown in FIG. 3, the recording head 122 includes a write portion, generally designated by reference number 124. The write portion 124 of the longitudinal recording head includes a pair of write poles 126 and 128 with a connecting yoke 130 there between. The write poles 126 and 128 are structured and arranged to apply a magnetic write field H to the magnetic recording medium 116, as is generally known. A hard magnetic recording layer, which in this embodiment is a longitudinal magnetic recording layer 142 as illustrated by the longitudinally oriented magnetic domains 144, is deposited adjacent to or on a stress-effecting layer 140.

The effective composite magnetic anisotropy (E) of a magnetic thin film structure, such as a recording medium, is the combination of the intrinsic crystalline anisotropy ($E_c$), the intrinsic shape anisotropy ($E_s$), and the magneto-elastic anisotropy ($E_e$) of the magnetic thin film. Crystalline anisotropy is determined by the crystalline property of each individual grain within the magnetic material. Shape anisotropy is determined by the shape of each individual grain within the magnetic material. Magneto-elastic anisotropy is induced by applied external forces that generate strains and/or stresses in the magnetic material. The combination of these anisotropies produce a composite effective magnetic anisotropy of a given thin film structure, such as the magnetic storage mediums 216, 316 and 416 shown in FIGS. 4a-4c. In one embodiment, the induced magneto-elastic anisotropy ($E_e$) can decrease the overall composite magnetic anisotropy (E) of the magnetic thin film during the writing process. The induced magneto-elastic anisotropy ($E_e$) can effectively cancel out at least some of the intrinsic crystalline anisotropy ($E_c$) and/or the intrinsic shape anisotropy ($E_s$) of the magnetic storage medium. Decreasing the composite effective magnetic anisotropy (E) during the writing process can improve the writeability of the magnetic recording medium by reducing the magnetic field required to switch the magnetic orientation of the magnetic layer 42.

Figure 4A:
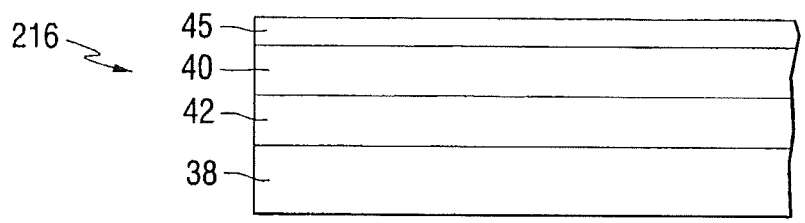
FIG. 4A is a schematic side view of a magnetic recording medium in accordance with the invention.
Figure 4B:
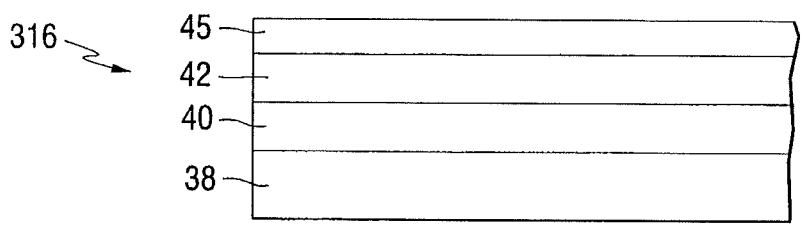
FIG. 4B is a schematic side view of a magnetic recording medium in accordance with the invention.
Figure 4C:
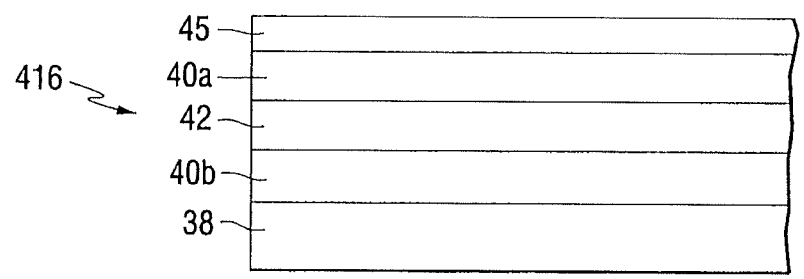
FIG. 4C is a schematic side view of a magnetic recording medium in accordance with the invention.

FIGS. 4A-4C are cross-sectional views of thin films, such as magnetic storage mediums 216, 316 and 416, in accordance with the present invention. The magnetic storage mediums 216, 316 and 416 can comprise a substrate 38 and a magnetic layer 42. The substrate 38 may comprise any suitable material such as ceramic glass, amorphous glass, or NiP plated AlMg. The magnetic layer 42 can comprise any suitable magnetic material, such as a hard magnetic material. Example hard magnetic materials include FePt, FePd, CoCrPt, CoCrPtB, Co—Pt alloys, or Co—Pt alloys with oxides such as $Co_2O_3$, $SiO_2$, NiO, $TiO_2$, $ZrO_2$ or $SnO_2$.

A stress-effecting layer 40 can be deposited adjacent the magnetic layer 42. As used herein, the term "stress-effecting layer" means a material and/or materials that, when activated, produce an induced magneto-elastic anisotropy in an adjacent magnetic layer 42. As used herein, the term "activated" means an external force is applied to the stress-effecting layer causing a change in volume and/or shape of the stress-effecting layer. External force can be generated by applied mechanical forces, applied electric and/or magnetic fields and/or applied heat. The applied external force alters the stress/strain between the stress-effecting layer 40 and the magnetic layer 42 by inducing a magneto-elastic anisotropy ($E_e$) which reduces the composite magnetic anisotropy (E) of the magnetic layer 42, thereby decreasing the magnetic field required to switch the magnetic orientation of the magnetic layer 42.

In one embodiment, the induced magneto-elastic anisotropy is localized within the magnetic layer 42. As used herein, the term "localized" means that energy in the surface between the stress-effecting layer 40 and the magnetic layer 42 is altered in regions having an area on the order of 1 bit. In another embodiment, the induced magneto-elastic anisotropy is transient. As used herein, the term "transient" means that the inducement of a magneto-elastic anisotropy in the magnetic layer 42 occurs only when the stress-effecting layer is activated, such as during the writing process. When the application of the external force to the stress-effecting layer is stopped, the transient induced magneto-elastic anisotropy ceases and the intrinsic magnetic anisotropy ($E_c$ and $E_s$) of the thin film is returned, thereby avoiding subsequent erasure of information.

As shown in FIG. 4A, the magnetic layer 42 can be deposited on the substrate 38 and the stress-effecting layer 40 can be deposited on the magnetic layer 42. As shown in FIG. 4B, the stress-effecting layer 40 can be deposited on the substrate 38 and the magnetic layer 42 can be deposited on the stress-effecting layer 40. As shown in FIG. 4C, a first stress-effecting layer 40b can be deposited on the substrate 38, the magnetic layer 42 can be deposited on the first stress-effecting layer 40b, and a second stress-effecting layer 40a can be deposited on the magnetic layer 42. In each of these embodiments, a protective overcoat 45, such as a diamond-like carbon and/or a lubricant layer may be applied over the hard magnetic recording layer 42 and/or stress-effecting layer 40. An optional seedlayer may be deposited on the substrate 38 in order to facilitate growth of the magnetic layer 42. The seedlayer may comprise any suitable material such as Pt, Cu, Ag, Al and/or combinations thereof, as is generally known.

When the stress-effecting layer 40 is activated, such as by exposure to an activator capable of applying a mechanical force, heat, magnetic field and/or electric field during the writing process, the stress-effecting layer 40 can expand or contract. Because the stress-effecting layer 40 is confined between the substrate 38, the magnetic layer 42 and/or the overcoat 45, perpendicular compressive/tensile elastic stresses are developed and transferred into the magnetic layer 42. Alternatively, as shown in FIG. 4C, a thin film structure 416 can comprise two stress-effecting layers 40a and 40b separated by a magnetic layer 42. Accordingly, the magnetic layer 42 can experience compressive/tensile stresses from both sides when the stress-effecting layers 40a and 40b are activated.

In one embodiment, the stress-effecting layer 40 can comprise at least one magnetostrictive material. A magnetostrictive material undergoes a change in volume and/or shape in response to a change in magnetization. In this embodiment, the magnetostrictive material generates a stress/strain in response to an applied magnetic field that propagates into the magnetic layer 42. Example magnetostrictive materials can include iron, cobalt and/or nickel in combination with praseodymium, terbium, samarium, holium, erbium and/or dysprosium, such as $TbFe_2$, $Tb_{0.3}Dy_{0.7}Fe_2$, CoFe, $Ni_2MnGa$, $Co_2MnGa$, CoNi, FeNiCoTi, Fe30 at % Pd, and Fe3Pt. The magnetostrictive material may have an anisotropic volume expansion relative to the direction of an applied magnetic field.

In another embodiment, the stress-effecting layer 40 can comprise a piezoelectric material. A piezoelectric material produces an electric charge when a mechanical force is applied to the material, and/or produces a mechanical force when an electric charge is applied to the material. In this embodiment, the piezoelectric material generates a strain/stress in response to an applied electrical field which propagates into the magnetic layer 42. Example piezoelectric materials include quartz crystal, lithium niobates, barium titanate, lead titanate, lead zirconate-lead titanate (including PZT and PZT including ternary system), meta-lead niobate, and/or polyvinylidenfluoride (PVDF).

In another embodiment, the stress-effecting layer 40 can comprise a thermal expansion material. A thermal expansion material increases in volume in response to an applied heat. The applied heat can have any elevated temperature, such as from slightly elevated room temperature to 300 degrees centigrade. Suitable sources of heat include activators such as lasers, which may be coupled with a HAMR head as shown in FIG. 2. When the stress-effecting layer 40 is subject to heat from an applied source, an intense transient thermal stress field is generated. In one embodiment, the maximum temperature applied to the stress-effecting layer 40 is well below the Curie temperature of the material. In another embodiment, the maximum applied temperature is about 200 Kelvin. By applying heat having a temperature of less than the Curie temperature of the material, the applied heat does not significantly alter the magnetization of the magnetic layer 42. Accordingly, heating a thermal expansion material to a temperature of less than the Curie temperature is distinct from HAMR, wherein the magnetic layer is heated close to the Curie temperature in order to eliminate magnetic anisotropy. Example thermal expansion materials include shape memory alloys such as NiTi, AuCd, CuAlNi, CuSn, InTi and FeMnSi, and aluminum, copper, nickel, iron, silver, gold and/or alloys thereof.

In another embodiment of the invention, the stress-effecting layer 40 can comprise an electrostatic material. An electrostatic material increases in volume and/or changes shape in response to an electric field. In one embodiment, a thin film structure constructed in accordance with FIG. 4C, comprises two stress-effecting layers 40a and 40b made of electrostatic materials. The first stress-effecting layer 40a is charged with a first electrostatic polarity during the writing process and the second stress-effecting layer 40b is charged with a second opposite electrostatic polarity during the writing process. Following Coulomb's law, stress-effecting layers 40a and 40b are attracted to each other and impose perpendicular compressive stress throughout the magnetic layer 42. Example electrostatic materials include silver, copper, aluminum, tungsten, iron, platinum, copper-manganese resistance alloy (managanin), lead and/or alloys thereof.

The stress-effecting layer of the present invention is suitable for use with conventional recording media as well as tilted recording media. Tilted recording media is characterized as media having a tilt angle between the direction of the magnetic easy axis and the surface normal that falls between 0° and 90°. The required media-switching field of a tilted media is minimum when it is applied at a 45° tilt angle to the magnetic anisotropy of the media. As used herein, the term "media switching field" is the field required to switch the media magnetization from a first direction to a second direction. When the media switching field is reduced, the signal to noise ratio (SNR) is increased, thereby allowing for a higher recording density. In traditional tilted media fabrication techniques, it is often difficult to obtain a true permanent 45° tilt angle because C-axis dispersions resulting from fabrication limitations can offset the tilt angle as much as +/−40°. In the present invention, a permanent tilt angle is not required to obtain the benefits of conventional tilted media, i.e. a reduction in the required media switching field. A tilting effect can be transiently induced in the media as a result of applying an external force to the stress-effecting layer. In a media having a magnetic easy axis tilted from the media normal axis, when an external force is applied to the stress-effecting layer 40, a magneto-elastic anisotropy ($E_e$) is induced in the magnetic layer 42. This transient induced magneto-elastic anisotropy ($E_e$) can effectively mimic a permanent tilt in the magnetic layer 42.

By inducing an induced magneto-elastic anisotropy ($E_e$) in the magnetic layer 42, a tilting effect can be achieved and/or enhanced in the thin film structure. Increasing the magneto-elastic anisotropy of the magnetic layer 42 and inducing a tilting effect in accordance with the invention can achieve higher recording densities.

When an external force is applied to the stress-effecting layer 40, the applied force propagates into the magnetic layer 42 and induces a transient magneto-elastic anisotropy field ($E_e$) according to Equation 1, where $\lambda_s$ is the saturation magnetostriction of the magnetic layer, σ is the elastic stress in the magnetic layer, and $M_s$ is the saturation magnetization.

$$E_e=(3\lambda_s\sigma)/M_s \qquad \text{Equation 1}$$

Figure 5:
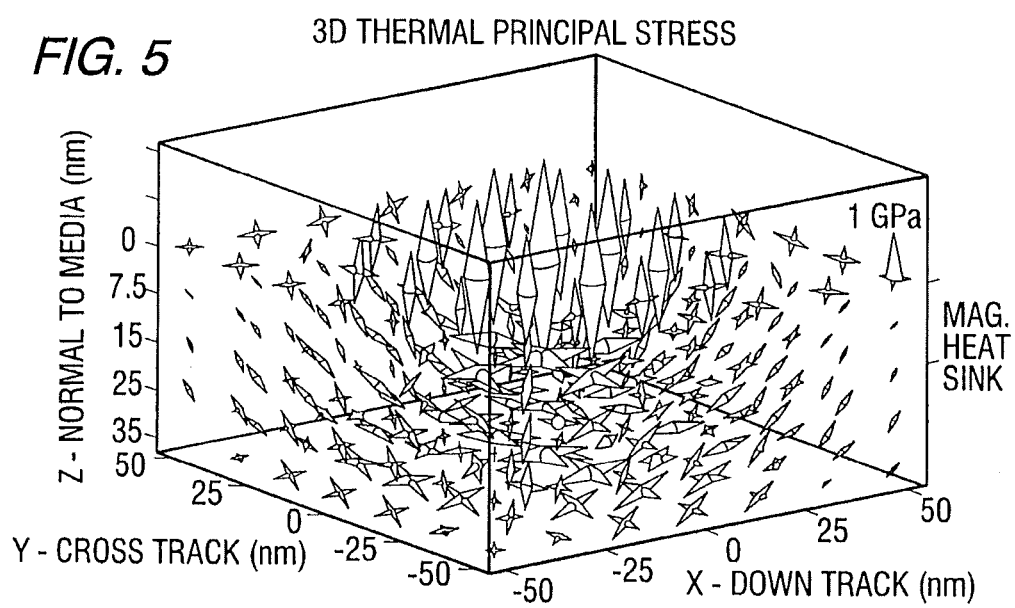
FIG. 5 is a graphical illustration of the principal stresses applied to the stress-effecting layer of a magnetic recording media in accordance with the invention.

FIG. 5 is an illustration of the principal stresses applied to a stress-effecting layer which then propagate into a magnetic layer. An axially symmetric distribution with respect to the perpendicular axis is achieved in the magnetic layer. At the center of the area of applied stress and/or strain, the perpendicular tensile strength is at a maximum. The principal stresses shown in FIG. 5 are thermal stresses in the form of an applied external heat of 200 Kelvin. The resulting perpendicular tensile strength shown in FIG. 5 is as high as 1 GPa, and can be as high as 2.2 GPa. These applied thermal stresses induce a magnetic anisotropy field according to Equation 1. For example, for a Co-alloy where $\lambda_s$=−130e-6 and $M_s$=360 emu/cc, the applied thermal stress introduces an in-plane magnetic anisotropy of 2.38 kOe. Therefore, the thermal stress can effectively alter the tilt angle of the media and enhance the magnetic anisotropy. Increasing the applied temperature can further enhance this effect.

The principal stress elongation of magnetic grains in the magnetic layer is substantially perpendicular due to in-plane constraints. Depending on the sign, i.e. positive or negative, of the magnetostriction constant $\lambda_s$ of the magnetic material, the perpendicular orientation becomes more stable and less favored in the plane of magnetization for a perpendicular anisotropy and less stable and more favored in the plane of magnetization for a longitudinal anisotropy. Consequently, the tilt angle will be enhanced for a longitudinal media and/or longitudinally tilted media, and reduced for a perpendicular and/or perpendicularly tilted media.

Figure 6:
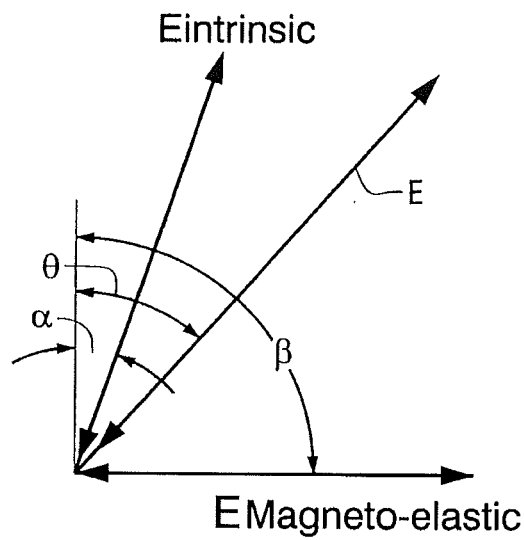
FIG. 6 is graphical illustration of the composite tilt angle resulting from application of an induced magneto-elastic anisotropy in accordance with the invention.

The transiently induced tilting effect can alter the tilt magnitude and/or tilt angle of the media from, for example, $\alpha$ to $\theta$ as shown in FIG. 6. In one example, an induced magneto-elastic anisotropy can alter the tilt angle of a thin film structure from more than 0° to 60°. As shown in FIG. 6, a desired tilt angle $\theta$, such as 45°, of the magnetic anisotropy (E) can be achieved by combining the tilt angle $\alpha$ of the shape anisotropy $E_s$ of the media, which has a tilt angle of less than 45° with an induced tilting effect angle $\beta$ for an in-plane magneto-elastic anisotropy $E_e$. An induced magneto-elastic anisotropy can achieve a desired tilting effect in an already tilted media, such as a strongly or weakly tilted media, or a media having no intrinsic tilt.

When a material has a uniaxial anisotropy that is tilted at an angle $\square$ where $0° \leq \square \leq 90°$, with respect to the perpendicular magnetization direction then, as shown in Equations 2-4, introducing in-plane magneto-elastic anisotropy by activating the stress-effecting layer increases the tilt angle and magnitude of the adjacent magnetic layer.

$$E_\perp = K_\perp \sin^2(\theta + \alpha) \quad \text{Equation 2}$$

In Equation 2, $E_\perp$ is a uniaxial magnetic anisotropy energy with a magnetic anisotropy energy constant of $K_\perp$ and a tilt angle $\alpha$. $\theta$ is the polar angle, which is the angle between the magnetization and the easy axis.

$$E_\parallel = K_\parallel \cos^2\theta \quad \text{Equation 3}$$

In Equation 3, $E_\parallel$ is an in-plane magneto-elastic anisotropy energy with a magnetic anisotropy energy constant of $K_\parallel$.

$$\begin{aligned} E &= E_\perp + E_\parallel \\ &= K_\perp \sin^2(\theta + \alpha) + K_\parallel \cos^2\theta \\ &= K_\perp(\sin^2\theta\cos^2\alpha + \cos^2\theta\sin^2\alpha + 2\sin\theta\cos\theta\sin\alpha\cos\alpha + \\ &\quad K_\parallel/K_\perp \cos^2\theta) \end{aligned} \quad \text{Equation 4}$$

In Equation 4, E is the composite magnetic anisotropy energy. By solving for the first and second derivative of E over the polar angle $\theta$, the tilt angle of the composite magnetic anisotropy can be obtained, represented by the hard axis where E is maximum ($\partial E/\partial \theta = 0$, $\partial^2 E/\partial \theta^2 > 0$), and the easy axis where E is the minimum ($\partial E/\partial \theta = 0$, $\partial^2 E/\partial \theta^2 < 0$). The magnetic anisotropy energy is represented by the difference between $E_{max}$ and $E_{min}$ according to Equation 5:

$$\frac{\partial E}{\partial \theta} = K_\perp(\sin 2\theta\cos 2\alpha + \sin 2\alpha \cos 2\theta - K_\parallel/K_\perp \sin 2\theta) \quad \text{Equation 5}$$

$$\frac{\partial E}{\partial \theta} = 0 \Rightarrow \tan 2\theta_0 = \frac{-\sin 2\alpha}{\cos 2\alpha - K_\parallel K_\perp}$$

-continued $$\left.\frac{\partial^2 E}{\partial \theta^2}\right|_{\theta=\theta_0} = K_\perp(2\cos 2\theta_0 \cos 2\alpha - 2\sin 2\alpha \sin 2\theta_0 - 2K_\parallel/K_\perp \cos 2\theta_0)$$

$$= 2K_\perp[(\cos 2\alpha - K_\parallel/K_\perp)^2 + \sin^2 2\alpha]\frac{\cos 2\theta_0}{\cos 2\alpha - K_\parallel/K_\perp}$$

In the case of a perpendicular recording media, $\alpha = 0°$, when Equation 6 is solved:

$$\begin{cases} E_{max} = E_{min} = K_\perp, & K_\parallel/K_\perp = 1 \\ E_{max} = K_\parallel \; \theta_{max} = 0°, 180°; E_{min} = K_\perp \; \theta_{min} = \pm 90°, & K_\parallel/K_\perp > 1 \\ E_{max} = K_\perp \; \theta_{max} = \pm 90°; E_{min} = K_\parallel \; \theta_{min} = 0°, 180°, & K_\parallel/K_\perp < 1 \end{cases} \quad \text{Equation 6}$$

the composite magnetic anisotropy either: [1.] disappears when $K_\parallel = K_\perp$ [2.] is in-plane when $K_\parallel > K_\perp$, or [3.] is perpendicular when $K_\parallel < K_\perp$, with an energy constant of $|K_\parallel - K_\perp|$.

In the case of a longitudinal recording media, $\alpha = 90°$, when Equation 6 is solved, $$E_{max} = K_\perp + K_\parallel \; \theta_{max} = 0°, 180°; E_{min} = 0 \; \theta_{min} = \pm 90°$$

the composite magnetic anisotropy is in-plane, with an energy constant of $K_\parallel + K_\perp$.

In the case of a tilted recording media, $0° < \alpha < 90°$, when Equation 6 is solved, $$\theta_{max} = \begin{cases} \frac{1}{2}\arctan\left(\frac{-\sin 2\alpha}{\cos 2\alpha - K_\parallel/K_\perp}\right), & \cos 2\alpha \geq K_\parallel/K_\perp \\ \frac{1}{2}\arctan\left(\frac{-\sin 2\alpha}{\cos 2\alpha - K_\parallel/K_\perp}\right) \pm 90°, & \cos 2\alpha \leq K_\parallel/K_\perp \end{cases}$$

$$\theta_{min} = \begin{cases} \frac{1}{2}\arctan\left(\frac{-\sin 2\alpha}{\cos 2\alpha - K_\parallel/K_\perp}\right), & \cos 2\alpha \leq K_\parallel/K_\perp \\ \frac{1}{2}\arctan\left(\frac{-\sin 2\alpha}{\cos 2\alpha - K_\parallel/K_\perp}\right) \pm 90°, & \cos 2\alpha \geq K_\parallel/K_\perp \end{cases}$$

$$E_{max} = K_\perp \sin^2(\theta_{max} + \alpha) + K_\parallel \cos^2\theta_{max}$$

$$E_{min} = K_\perp \sin^2(\theta_{min} + \alpha) + K_\parallel \cos^2\theta_{min}$$

the composite magnetic anisotropy is a function of $K_\parallel$, $K_\perp$, and $\alpha$.

In tilted magnetic recording media, the crystallographic orientations of the magnetic films may not exactly align with the columnar growth orientations of the magnetic grains. For certain thin film magnetic media, the crystallographic orientations may remain normal to the substrate planes, irrespective of deposition angle. Accordingly, an induced magneto-elastic anisotropy in accordance with the invention can provide a transient supplementary tilting mechanism in order to obtain the desired tilted magnetic anisotropy.

Figure 7:
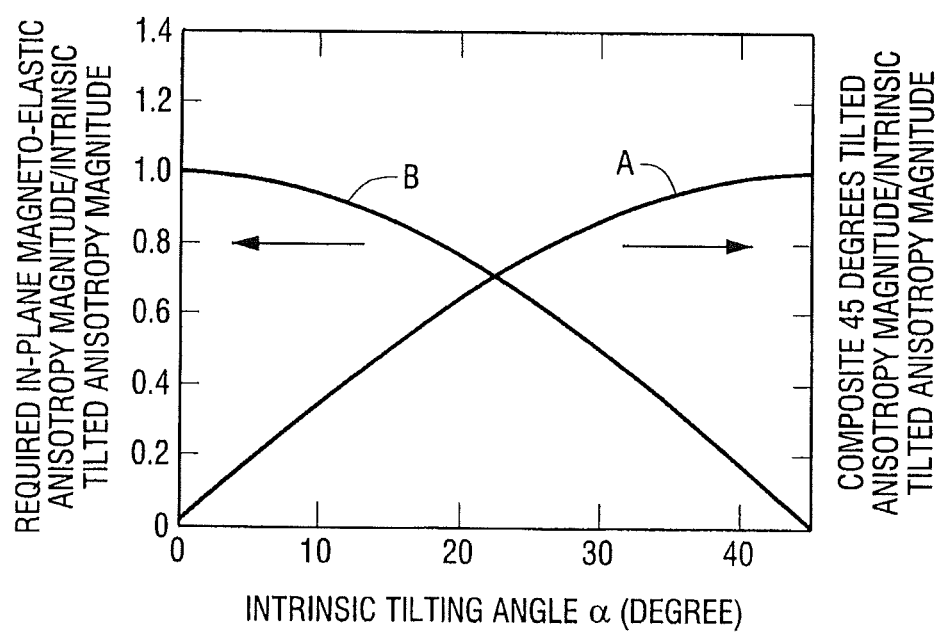
FIG. 7 is a graphical illustration of the magneto-elastic induced tilted media versus the intrinsic tilt angle in accordance with the invention.

For a tilted media having an initial tilt angle $\alpha$, where $0 < \alpha < 45$, in order to obtain a 45 degree composite tilting, an in-plane magneto-elastic anisotropy is needed with a magnitude ratio, as compared to the intrinsic anisotropy, following the design curve shown in FIG. 7. The resulting composite tilted anisotropy has a magnitude ratio, as compared to the intrinsic tilted anisotropy, following line A. The required in-plane magneto-elastic anisotropy has a magnitude ratio, as compared to the intrinsic tilted anisotropy, following line B.

Figure 8:
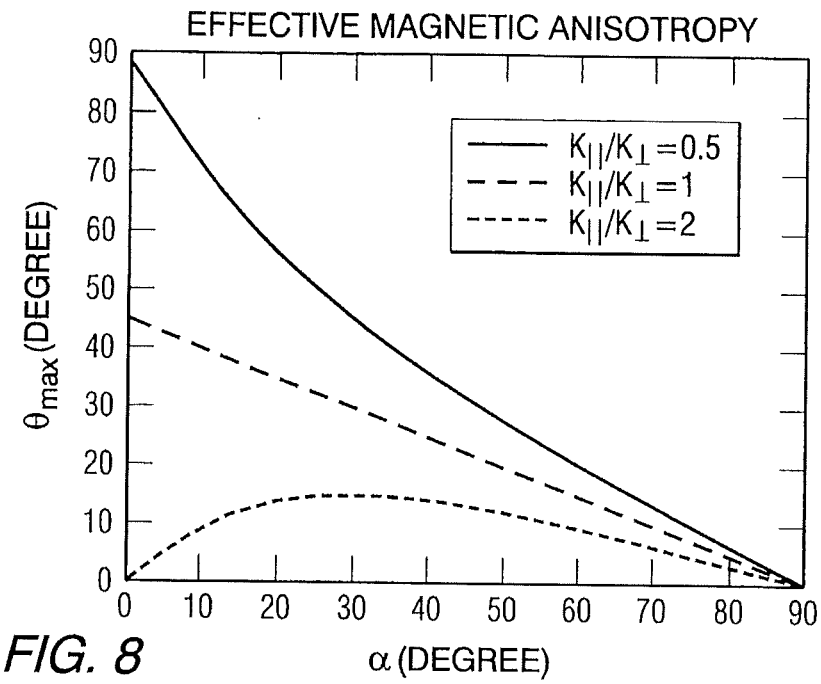
FIG. 8 is graphical illustration of the relationship between in-plane magneto-elastic anisotropies and tilt angle in accordance with the invention.
Figure 9:
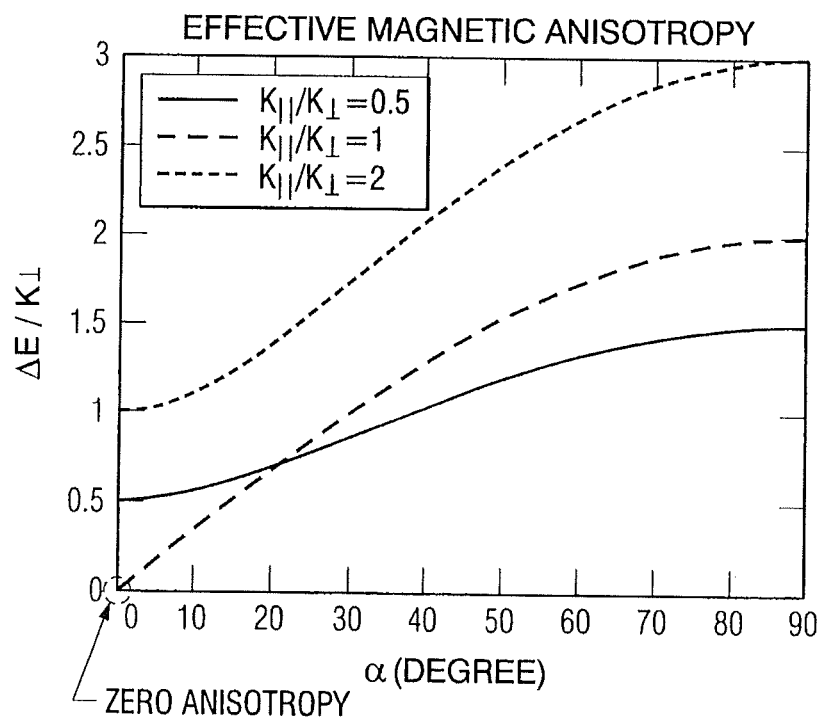
FIG. 9 is a graphical illustration of the relationship between the magnitude of the effective magneto-elastic anisotropy and the intrinsic tilt angle in accordance with the invention.

FIG. 8 shows the variation of the tilt angle $\theta_{max}$ of the composite magnetic anisotropy with the initial tilt angle $\alpha$ at different in-plane magneto-elastic anisotropy energies $K_\parallel$ (normalized with the initial tilted magnetic anisotropy energy $K_\perp$). As shown in FIG. 8, the tilt angle of the composite magnetic anisotropy increases with $K_\parallel$. FIG. 9 shows the variation of the composite magnetic anisotropy energy (normalized with $K_\perp$) with the initial tilt angle at different in-plane magneto-elastic anisotropy energies $K_\parallel$ (normalized with the initial tilted magnetic anisotropy energy $K_\perp$). As shown in FIG. 9, the magnitude of the composite magneto-elastic anisotropy energy depends on the intrinsic tilt angle α and the ratio of the two magnitudes ($K_\parallel/K_\perp$). As shown in FIG. 9, for a perpendicular media with α=0, an in-plane magneto-elastic anisotropy with the same magnitude ($K_\parallel = K_\perp$) simply cancels out the magnetic anisotropy.

The elastic stress induced magnetic anisotropy does not affect the orientation of tilted magnetic anisotropy with respect to the disk. Since the elastic stress is axially symmetric with respect to the perpendicular direction, the induced anisotropy has an easy plane in the plane of the medium; and symmetry dictates that the effect of the stress-induced anisotropy will be to increase the angle of the net effective anisotropy of the grain, irrespective of the azimuthal orientation of the grain defined by the degree of down track or cross track tilt.

As discussed above, the present invention is suitable for use with perpendicular, longitudinal and tilted media. However, certain additional benefits are recognized when the present invention is applied to tilted media. In traditional tilted media, the magnetization of an isolated bit is reduced as the tilt angle increases. A minimum energy barrier is found as a function of the tilt angle for a region with a large number of bits of the same polarity. As a result, this leads to an increased loss of signal for the tilted media. However, this effect would disappear if the tilt angle is a transient effect, i.e., only present during the transient writing process. The applied stress and/or strain on the stress-effecting layer can be ceased once the writing process is complete. Accordingly, the transient stress induced magneto-elastic anisotropy disappears and the intrinsic anisotropy $E_{intrinsic}$ of the media takes over.

EXAMPLE

A sample magneto-elastic assisted tilted media design was constructed comprising a cobalt magnetic layer having a thickness of 15 nm and a stress-effecting layer comprising magnetostrictive material TbFe$_2$ having a thickness of 10 nm. The tilted media had an intrinsic shape anisotropy with a 20° tilt angle and 20 kOe magnetic anisotropy energy constant. In order to obtain a 45° tilted composite anisotropy, an in-plane magneto-elastic anisotropy with a magnetic anisotropy energy constant of 15 kOe was applied. The magnetic layer had a saturation magnetostriction constant value of $\lambda_s$=−130e-6 and a saturation magnetization value of $M_s$=360 emu/cc. A proper longitudinal magnetic field was applied to the stress-effecting layer to generate an applied stress of 1.38 GPa. The corresponding 45° titled composite anisotropy had a magnetic anisotropy energy constant of 13 kOe. This elastic stress can be very effective in altering the tilting angle and enhancing the magnetic anisotropy. It is anticipated that increasing the excitation in the stress-effecting layer can enhance this effect.

Whereas particular embodiments of this invention have been described above for purposes of illustration, it will be evident to those skilled in the art that numerous variations of the details of the present invention may be made without departing from the invention as defined in the appended claims.

What is claimed is:

1. A method, comprising:
rotating a magnetic recording medium adjacent a data transducer, the medium comprising a stress-effecting layer and a magnetic layer; and
activating the stress-effecting layer to induce a magneto-elastic anisotropy in the magnetic layer.

2. The method of claim 1, wherein activating the stress-effecting layer reduces a composite effective magnetic anisotropy of the magnetic layer.

3. The method of claim 1, wherein the induced magneto-elastic anisotropy is localized to a region of the medium having an area on the order of one bit in the magnetic layer.

4. The method of claim 1, wherein the induced magneto-elastic anisotropy occurs only when the stress-effecting layer is activated.

5. The method of claim 1, wherein the stress-effecting layer is activated by one or more of:
heating the stress-effecting layer;
applying a mechanical force to the stress-effecting layer;
applying an electric field to the stress-effecting layer; or
applying a magnetic field to the stress-effecting layer.

6. The method of claim 1, wherein the magnetic layer of the medium comprises one of a perpendicular magnetic recording layer, a longitudinal magnetic recording layer, or a tilted magnetic recording layer.

7. The method of claim 1, wherein the stress-effecting layer comprises a magnetostrictive material including at least one of: iron, cobalt, and/or nickel in combination with praseodymium, terbium, samarium, holium, erbium and/or dysprosium.

8. The method of claim 1, wherein the stress-effecting layer comprises a piezoelectric material including at least one of: quartz crystal, lithium niobates, barium titanate, lead titanate, lead zirconate-lead titanate, meta-lead niobate, and/or polyvinylidenfluoride.

9. The method of claim 1, wherein the stress-effecting layer comprises a thermal expansion material including at least one of: a shape memory alloy, aluminum, copper, nickel, iron, silver, gold, and/or alloys thereof.

10. The method of claim 1, wherein the stress-effecting layer comprises an electrostatic material including at least one of: silver, copper, aluminum, tungsten, iron, platinum, lead and/or alloys thereof.

11. The method of claim 1, wherein the magnetic recording medium further comprises an additional stress-effecting layer adjacent the magnetic layer.

12. The method of claim 11, wherein the stress-effecting layer comprises an electrostatic material having a first polarity and the additional stress-effecting layer comprises an electrostatic material having a second polarity, the second polarity being opposite the first polarity.

13. A method, comprising:
positioning a recording head adjacent to a data storage medium including a stress effecting layer adjacent to a magnetic layer;
activating the stress-effecting layer to induce a magneto-elastic anisotropy in the magnetic layer; and
applying a magnetic field to the data storage medium to write data to the data storage medium.

14. The method of claim 13, wherein activating the stress-effecting layer reduces a composite effective magnetic anisotropy of the magnetic layer.

15. The method of claim 13, wherein the induced magneto-elastic anisotropy is localized to a region having an area on the order of one bit in the magnetic layer.

16. The method of claim 13, wherein the induced magneto-elastic anisotropy occurs only when the stress-effecting layer is activated.

17. The method of claim 13, wherein the stress-effecting layer is activated by one or more of:
   heating the stress-effecting layer;
   applying a mechanical force to the stress-effecting layer;
   applying an electric field to the stress-effecting layer; or
   applying a magnetic field to the stress-effecting layer.

18. The method of claim 13, wherein the stress-effecting layer is activated by heating the stress-effecting layer to a temperature less than a Curie temperature of the magnetic layer.

19. The method of claim 18, wherein the stress-effecting layer is heated to a temperature less than about 200° K.

20. The method of claim 13, wherein the data storage medium further comprises an additional stress-effecting layer adjacent the magnetic layer.

* * * * *